US006660310B2

(12) United States Patent
Carlson

(10) Patent No.: US 6,660,310 B2
(45) Date of Patent: Dec. 9, 2003

(54) METHOD TO INFUSE FRESH FRUITS AND VEGETABLES WITH AN AGENT

(75) Inventor: Peter S. Carlson, Chevy Chase, MD (US)

(73) Assignee: American Moxie LLC, Ardsley, NY (US)

( * ) Notice: Subject to any disclaimer, the term of this patent is extended or adjusted under 35 U.S.C. 154(b) by 69 days.

(21) Appl. No.: 09/860,240

(22) Filed: May 18, 2001

(65) Prior Publication Data

US 2002/0012725 A1 Jan. 31, 2002

Related U.S. Application Data

(60) Provisional application No. 60/205,322, filed on May 18, 2000.

(51) Int. Cl.[7] ............................................. A61K 35/78
(52) U.S. Cl. ........................................ 424/777; 424/725
(58) Field of Search ................................. 424/725, 777

(56) References Cited

U.S. PATENT DOCUMENTS

| | | | | |
|---|---|---|---|---|
| 3,952,112 | A | * | 4/1976 | Fulger et al. |
| 4,018,908 | A | | 4/1977 | Gross |
| 4,284,651 | A | * | 8/1981 | Bruemmer |
| 4,402,987 | A | | 9/1983 | von Lersner et al. |
| 4,460,610 | A | | 7/1984 | Macfie, Jr. |
| 4,832,969 | A | | 5/1989 | Lioutas |
| 5,000,967 | A | * | 3/1991 | Adams et al. |
| 5,000,972 | A | * | 3/1991 | Nafisi-Movahar |
| 5,200,217 | A | * | 4/1993 | Elliott et al. |
| 5,366,995 | A | * | 11/1994 | Savage et al. |
| 5,368,873 | A | * | 11/1994 | Aebi et al. |
| 5,939,112 | A | | 8/1999 | Katayama et al. |
| 5,968,573 | A | | 10/1999 | Kaufman |
| 6,231,866 | B1 | * | 5/2001 | Mann |

FOREIGN PATENT DOCUMENTS

| | | | |
|---|---|---|---|
| EP | 0404543 | * | 12/1990 |
| ES | 2137869 | * | 12/1999 |
| WO | WO 87/03454 | | 6/1987 |
| WO | WO 99/35917 | * | 7/1999 |

OTHER PUBLICATIONS

Conway, W.S.; Sams, C.E.; and Watada, A.E., "Relationship Between Total and Cell Wall Bound Calcium in Apples Following Postharvest Pressure Infiltration of Calcium Chloride", 1995, Acta Horticulturae 398, Postharvest Physiology of Fruits, pp. 31–39.

Janisiewicz, Wojciech, J.; Conway, William S.; Glenn, D. Michael; and Sams, Carl E., "Integrating Biological Control and Calcium Treatment for Controlling Postharvest Decay of Apple", Feb. 1998, HortScience vol. 33(1), pp. 105–109.

Conway, William S.; Janisiewicz, Wojciech, J.; Klein, Joshua, D.; and Sams, Carl E., "Strategy for Combining Heat Treatment, Calcium Infiltration, and Biological Control to Reduce Postharvest Decay of 'Gala' Apples", Jul. 1999, HortScience, vol. 34(4), pp. 700–704.

* cited by examiner

*Primary Examiner*—Christopher R. Tate
(74) *Attorney, Agent, or Firm*—St. Onge Steward Johnston & Reens LLC

(57) ABSTRACT

A method of infusing an edible fresh or freshly-cut fruit or vegetable is provided. First, the fruit or vegetable is allowed to reach a state of relative metabolic stasis or inactivity. Next, an infusion comprising an agent to be infused is provided, and the fruit or vegetable is submerged therein. Finally, the infusion is pressurized to a pressure for a time period. The agent to be infused is preferably a quality enhancing agent, a nutritionally beneficial agent, a pharmaceutical agent, or combinations of these. Most preferably, the quality enhancing agent may be an aroma enhancing agent, a flavoring enhancing agent, a sweetening agent, a color enhancing agent, or combinations of these, the nutritionally beneficial agent may be a vitamin, a mineral, an anti-oxidant, a phytochemical, or combinations of these, and the pharmaceutical agent may be a prescription drug, an over-the-counter drug, or combinations of these.

49 Claims, No Drawings

METHOD TO INFUSE FRESH FRUITS AND VEGETABLES WITH AN AGENT

CROSS-REFERENCE TO RELATED APPLICATIONS

This application claims the benefit, under 35 U.S.C. §119(e), of U.S. Provisional Patent Application No. 60/205,322, filed May 18, 2000.

BACKGROUND OF THE INVENTION

The present invention relates to a method of infusing edible fruits and vegetables with an agent, and more specifically to a method of infusing edible fresh and freshly-cut fruits and vegetables with a quality enhancer, a nutritional supplement, a pharmaceutical agent, any other agent beneficial to humans or animals and/or combinations thereof.

Prior to and during the harvesting process both fresh fruits and vegetables are highly metabolically active as they complete the ripening or maturation process. For example, ripening of climactic fruits such as apples, peaches and tomatoes proceeds according to a genetically defined developmental process that results in the production of numerous hydrolytic and catabolic enzymes. Essentially, these multiple enzyme systems degrade precursors in the immature fruit such as polysaccharides to their components that are present in the ripened fruit such as sugars. The natural developmental endpoint of the maturation process is an over ripened fruit that is prone to microbial attack and rot. To avoid over ripeness, microbial attack and rot and to maintain fruit and vegetable quality, the horticultural industry has developed methodologies and techniques for storage and preservation of fresh fruits and vegetables. These methods include refrigeration and modified atmosphere manipulations that retard or delay respiration and the ripening process and inhibit or slow the natural activity of hydrolytic and catabolic enzymes. These manipulations also include the application of agents such as $Ca^{++}$, fungicides and coatings that retard microbial attack.

Thus, it is known in the art to immerse some foods in liquids to help preserve the food. For example, liquids containing $Ca^{++}$ have been introduced under pressure into the skin of apples to prevent microbial degradation of the apples and the subsequent rotting thereof, thus extending shelf life. Other types of preservative liquids have also been used. However, today's consumer is leery of food additives. The word "preservatives" has a generally negative connotation and products that market as "all natural" and "no preservatives added" have enjoyed a great deal of success in the marketplace.

Moreover, due to the nature of preservatives, such as in the $Ca^{++}$ example, it is desirable to infuse the fruit or vegetable with such preservatives immediately after harvesting to inhibit post harvest decay and microbial infection. However, it has been discovered that if nutritional, flavoring and pharmaceutical agents directed towards human benefit are applied during this directly post harvest time period (i.e., when metabolism is still active), such beneficial products may be hydrolyzed or otherwise degraded, or converted into other materials by enzymes present in the fruit or vegetable.

Past efforts to improve and enhance the taste of foods have often dealt with efforts to increase the sweetness of a food product. It is known to immerse processed vegetables in a sweetened liquid to increase the sugar content and hence enhance their taste. Of course some foods such as canned fruits are often packed in a syrup or other sweetening liquid. The modern trend, however, among consumers is to avoid the heavy syrups associated with such processed fruits, as a perception exists among consumers that it is healthier to consume fresh fruits and vegetables.

Moreover, millions of dollars are spent each year by consumers on vitamin and mineral supplements, and the benefits of vitamins in the diet are extolled from many different sources today, including a significant number of physicians. Physicians have traditionally downplayed the role of vitamin supplements and until fairly recently have instructed patients that they should be able to get all the vitamins and nutrients they need from the foods they eat. The United States government has even become involved in the process by releasing the "food pyramid" to help Americans eat a more healthy and nutritious diet.

Furthermore, while the market for healthful foods is on the rise, consumers also spend vast sums of money each year on pharmaceutical products, both prescription as well as over-the-counter medications. Medication is often taken in pill form because of the unpleasant taste of the medication. This is particularly a problem when a young child needs to take medications. Often the medicine is suspended in a liquid base to mask the flavor and to make it more palatable.

It would therefore be desirable for people to get the nutritional supplements they want and need by eating the fresh foods they already enjoy without requiring them to take a separate supplement.

Additionally, it would also be desirable to be able to take a medication by consuming a food that is already enjoyed without the need to mask the medication in a pill or liquid form.

SUMMARY OF THE INVENTION

The present invention is directed to a method for infusing fresh fruits and/or vegetables with an agent or agents including one or more of the following: vitamins, minerals, flavor enhancers, sweeteners, coloring agents, pharmaceuticals and/or substantially any other substance beneficial to humans or other animals which is capable of being infused for supplementing the characteristics and properties of the food.

It is an object of the present invention to provide a method by which fresh fruits and vegetables are infused with vitamin and or mineral supplements to nutritionally enhance the food's natural properties.

It is another object of the present invention to provide a method by which fresh fruits or vegetables are infused with flavor enhancers to improve the taste, texture, color or other desirable properties of the food.

It is yet another object of the present invention to provide a method of infusing fresh fruits and vegetables with pharmaceutical agents to allow persons to receive a medically effective dose of a desired pharmaceutical.

It is still another object of the present invention to provide a method of infusing fresh fruits and vegetables with an agent that is not metabolized by the fruit or vegetable.

In accordance with the objects of the invention it is possible to infuse a fruit or vegetable with a substance which allows for the performance of an assay to determine or assess possible microbial contamination.

These and other objects of the present invention are achieved by the provision of a method of infusing an edible fresh or freshly-cut fruit or vegetable. First, the fruit or vegetable is allowed to reach a state of relative metabolic stasis or inactivity, as described hereinbelow, before the outside surface of the fruit or vegetable is disinfected. Next, an infusion bath comprising an agent to be infused and a surfactant is provided, and the fruit or vegetable is submerged therein. Finally, the infusion bath is pressurized to a pressure for a time period. The pressure may be a positive pressure or a negative pressure (i.e., a partial vacuum) as described more fully below.

Preferably, the surface of the fruit or vegetable is disinfected with a bleach solution and/or an antimicrobial soap solution. More preferably, the solution has a concentration in the range of about 0.01% to about 10%, and most preferably, the solution has a concentration of about 2%.

The agent to be infused is preferably a quality enhancing agent, a nutritionally beneficial agent, a pharmaceutical agent, or combinations of these. Most preferably, the quality enhancing agent may be an aroma enhancing agent, a flavoring enhancing agent, a sweetening agent, a color enhancing agent, or combinations of these, the nutritionally beneficial agent may be a vitamin, a mineral, an anti-oxidant, a phytochemical, or combinations of these, and the pharmaceutical agent may be a prescription drug, an over-the-counter drug, or combinations of these.

Preferably the surfactant is polysorbate 20, or an organosilicone surfactant. More preferably, the surfactant has a concentration in the range of about 0.0001% to about 1%, and most preferably the surfactant has a concentration of about 0.001%.

The infusion bath is pressurized to a pressure in the range of about 1 kPa to about 1000 kPa. Preferably, the infusion bath is pressurized to a pressure in the range of about 10 kPa to about 100 kPa, with the most preferable range being about 20 kPa to about 40 kPa. A pressure of about 30 kPa has generally been found to provide optimal results. The infusion bath is pressurized for a time period in the range of about 0.1 minutes to about 60 minutes. It is preferable that the infusion bath is pressurized for a time period in the range of about 1 minute to about 30 minutes, with the most preferred range being about 5 minutes to about 15 minutes. A time period of about 10 minutes has been found to provide optimal results. The pressure may be a positive pressure or a negative pressure (i.e., a partial vacuum) as described more fully below, although a positive pressure is preferred.

It is also preferable that the fruit or vegetable be rinsed with water after the disinfecting step and after the pressurizing step.

The invention and its particular features and advantages will become more apparent from the following detailed description of the present invention.

DETAILED DESCRIPTION OF THE INVENTION

It has been discovered that when edible fresh or fresh-cut (i.e., lightly processed) fruits and vegetables which are in a state of relative metabolic stasis or inactivity are submerged in a solution of a quality enhancing agent (i.e. agents which improve aroma, flavoring, sweetening and/or coloring), while subjecting the food to a transitory pressure regime, the food becomes infused with the desired agent, and the quality of the food is therefore enhanced. As discussed above, while it has been known to infuse some foods with preservatives, such as Ca++, by immersing them under pressure in liquids containing the preservative, the use of preservatives is undesirable. Moreover, as discussed more fully below, simply immersing a food in a liquid under pressure may not result in an optimum amount of the agent being infused.

Furthermore, it is important to note that the nutritional, flavoring and pharmaceutical agents directed towards human benefit and applied as described in this application are contemplated to be delivered at the end of the storage process (i.e. during a period of relative metabolic stasis or inactivity of the fruit or vegetable) so that they are not metabolized by the hydrolytic and catabolic enzymes present in the actively ripening and maturing fruit. Post storage application of beneficial agents to fresh fruits and vegetables results in more defined, controlled and undegraded amounts of these materials in the final consumed food product.

It should be noted that what is meant by "metabolic stasis or inactivity" as used herein is that the hydrolytic and catabolic enzymes present in the actively ripening and maturing fruit have reached a point where they have been substantially minimized.

It has also been discovered that using a similar infusion method, a fresh fruit or vegetable can act as the delivery vehicle for agents beneficial to the person consuming the food (as opposed to being beneficial to the food product itself), making fresh fruits and vegetables even more attractive to consumers. For example, a fresh fruit or vegetable can be infused with nutritional agents such as vitamins, minerals, anti-oxidants or phytochemicals, thus allowing the fruit or vegetable to be the delivery mechanism for these nutritional agents. Of course, the above listed nutritional agents are merely examples and it should be understood that substantially any nutritional agent which can be suspended in a liquid could be infused into a fresh fruit or vegetable according to the present invention. Preferably, the liquid is primarily aqueous, although such is not strictly required.

It has further been discovered that using a similar infusion method, a fresh fruit or vegetable can be infused with a pharmaceutical agent, thereby allowing a person to receive a biologically effective dose thereof. For example, pharmaceutical or biological agents such as aspirin would be released into the digestive system along with the fresh fruit or vegetable. Numerous other pharmaceutical agents, both prescription and over-the-counter, may be infused according to the present invention so long as the agent is capable of being suspended in an aqueous liquid without damaging its pharmaceutical properties.

It should be noted that the term "agent" used throughout this application refers to a single agent or a combined group of agents (i.e. a flavor enhancer and a vitamin could both be present in the immersion liquid and together they would be termed an "agent"). It should also be understood that the agent is efficaciously maintained by being infused within the food item itself, and a person consuming the food processed according to the present invention obtains the benefit of the fresh fruit or vegetable, as well as the additional benefit of the infused agent.

It should also be noted that although the detailed description refers to an infusion bath in which the specimen is submerged, it is also possible to coat the specimen with an infusion spray, and then to pressurize the coated specimen. Thus, when the term "infusion" is used herein, it is meant to encompass infusion baths, infusion sprays, and any other mechanism by which an agent to be infused may be introduced into the outer surface of the fruit or vegetable to be infused.

The pressure may be a positive pressure or a negative pressure (i.e., a partial vacuum). If a negative pressure is to be employed, the fruit or vegetable is coated with the infusion while the negative pressure is applied. After coating, the negative pressure is released, and atmospheric pressure is restored (or positive pressure is applied). Testing has revealed, however, that while negative pressures may be employed, positive pressures are preferred

EXPERIMENTAL APPROACHES

Materials

Whole fresh fruits and vegetables comprising the biological materials were purchased on the date of use. These included: Gala apples, strawberries, seedless grapes, cherry tomatoes, celery, carrots and squash. Care was taken insofar as was possible not to employ biological materials which had been pre-treated with wax or other coating agents or that had received prior treatment with biocides.

Surface Sterilizing Disinfecting Biocide Agents:

Either Clorox® bleach (distributed by The Clorox Company of Oakland, Calif.) in a 2% solution, or Safesoap® antimicrobial liquid hand soap (distributed by Colgate-Palmolive Company of New York, N.Y.) in a 2% solution.

Surfactants

Either Tween® 20 (also known as polysorbate 20) surfactant (distributed by ICI Americas Inc. of Wilmington, Del.) or Silwet® organosilicone surfactant (distributed by OSI Specialties, Inc. of Danbury, Conn.) at a final concentration of 0.001% in the infusion bath.

Infused agents: Calcium chloride ($CaCl_2$), and zinc chloride ($ZnCl_2$) as nutrients; saccharin, aspartame, capsaicin (8-methyl-N-vanillyl-6-nonenamide) and glutamate as flavoring agents; and methylscopolamine (anticholinergic), clozapine (antipsychotic), flunitrazepam (hypnotic), pyrilamine (antihistaminic) and methyltrienolone (anabolic steroid) as pharmaceuticals. These molecules and $^3H$ labeled forms of certain of these agents were acquired from various suppliers. Final tritiated concentrations of radiolabeled agents were established by dilution to approximately 10,000 dpm/mg.

Scientific Equipment

A Beckman® model LS 3801 scintillation counter employing Scintisafe® 30% counting fluid for detection of $^3H$ (such a system being distributed by Beckman Coulter, Inc. of Fullerton, Calif.). A Shimadzu® model M-6601 F atomic absorption flame emission spectrophotometer (distributed by Shimadzu Scientific Instruments, Inc. of Columbia, Md.) for detection of metals. A Beckman® model J2 centrifuge (distributed by Beckman Coulter, Inc. of Fullerton, Calif.) for separation of liquid fractions. A Welch Duo-Seal® model 1402 air pump (distributed by Sargent-Welch Co. of Buffalo Grove, Ill.) for creation of vacuum and of pressure conditions.

Experiment 1—Surface Sterilization and Disinfection:

It was demonstrated that pre-infusion surface sterilization and disinfecting of biological materials with biocides is preferable for the post-infusion health and storage-life of materials that are subjected to pressure or vacuum treatments for infusion. When the terms "sterilization," "disinfection" or derivatives of these are used herein, what is meant is any process for clensing the surface of the fruit or vegetable to reduce particular and/or microbial content thereof to decrease the opportunity for contamination.

The following procedures were employed and the following tabulated resulting data obtained:

i) Treatments prior to infusion: none (control), or (1) rinse 2× with water, or (2) wash in Clorox® bleach solution then rinse 2' with water, or (3) wash in Safesoap® antimicrobial liquid hand soap solution then rinse 2× with water.

ii) Infuse materials at 50 kPa for 15 minutes in a distilled water bath then release the pressure differential. The infusion bath did not contain any agents to be infused.

iii) Post-infusion rinse 2× in water followed by air-drying and 7 day (for strawberry and grape) or 14 day (celery, carrot and tomato) or 21 day (apple) storage at room temperature.

iv) Visually rate storage characteristics of materials and both absolute and relative extent of damage, decay and/or rot on a standard scale. Scale: N, no damage or decay; S, some damage or decay; M, moderate damage or decay; and E, extensive damage or decay. Note that significant water loss was noticed on both celery and strawberry.

TABLE 1

Results of Experiment 1

| Treatment | Material |||||| 
|---|---|---|---|---|---|---|
|  | Apple | Celery | Carrot | Tomato | Strawberry | Grape |
| No infusion | N/S | N | N | N | N/S | N |
| Control | S/M | M | S/M | M | E | M |
| 1) | S/M | S | S | M | E | M |
| 2) | N | N | N | N | N/S | N |
| 3) | N | N | N | N | N/S | N |

Comments

Similar but less obvious protective results of surface sterilization were observed with partial vacuum infusion treatments by exposing materials to −20 kPa for 15 minutes (data not presented). Vacuum resulted in occasional spots of water soaking which became prime sites of damage and decay formation. Additionally, vacuum appeared to cause some direct tissue damage to the biological materials. Note also that similar results with biocides and vacuum are observed in the presence of surfactants in the infusion bath in pressure treatment. However, surfactants increased the number and size of sites of water soaking in vacuum treatments.

Conclusions

The following conclusions resulted from Experiment 1:

i) Surface sterilization and disinfecting with biocides prior to infusion clearly extends shelf-life and decreases post-treatment decay of infused biological materials.

ii) Surfactants at a low level in the infusion bath are not harmful with pressure treatments.

iii) Vacuum is not as effective as pressure at the levels here employed, and vacuum appears to cause minor tissue damage. Vacuum also appears less compatible with surfactants.

Experiment 2—Optimization of Pressure and Duration of Infusion

It was demonstrated that the optimum pressure and duration of infusion treatments varies depending upon the material used. The following procedures were employed and the following tabulated resulting data obtained:

i) Weigh the individual fruit and vegetable materials.

ii) Wash with Clorox® bleach solution then rinse 2X in water.

iii) Place in infusion bath of distilled water and 2% $^3H$ glutamate.

iv) Pressurize the bath at various kPa values and for various time periods.

v) Remove material and rinse 2× with water.

vi) Macerate tissue and collect liquid (supernate) fraction after centrifugation at 5,000 rpm for 15 minutes and record the volume of this fraction.

vii) Dry down a portion of the collected liquid fraction which represents one gram wet weight of the initial fruit or vegetable as calculated in the first step (step i) of the protocol.

viii) Place the liquid fraction from step seven (step vii) in a scintillation vial and add scintillation fluid followed by counting in a scintillation counter.

ix) Construct a standard curve relating radioactivity and glutamate concentration by adding known quantities of $^3$H glutamate to untreated tissue which is then macerated to determine the values when prepared as described in previous steps.

x) Calculate the micrograms ($10^{-6}$ grams) of the glutamate agent infused per gram fresh weight of the various biological materials by comparison with the standard curve constructed in step nine (step ix).

TABLE 2

Results of Experiment 2
(Expressed in µg infused agent (glutamate) per gram fresh weight material per 15 minute pressure treatment)

| Treatment | Material | | | | | |
|---|---|---|---|---|---|---|
| | Apple | Celery | Carrot | Tomato | Strawberry | Grape |
| 0 kPa | 5 | 17 | 11 | 13 | 22 | 15 |
| 10 kPa | 110 | 231 | 182 | 198 | 314 | 247 |
| 20 kPa | 319 | 525 | 332 | 388 | 553 | 372 |
| 30 kPa | 374 | 613 | 407 | 531 | 682 | 443 |
| 50 kPa | 485 | 719 | 422 | 653 | 821 | 466 |
| 75 kPa | 459 | 733 | 437 | 672 | 840 | 457 |
| 100 kPa | 501 | 745 | 458 | 641 | 779 | 481 |

Note: Some tissue damage occurs at 100 kPa in most materials.

Comments

Similar work (data not presented) with timing at 1, 3, 10, 20 and 30 minutes using 30 kPa demonstrates that 10 minutes provides a sufficient time at which a relative plateau level of infusion is achieved. It should also be noted that the above experiments were directed at optimizing the speed or delivery of each agent irrespective of the effective dose. The effective dose of each agent must be specifically determined for each agent and for each fruit or vegetable, as it is possible that too much or too little of an agent may be infused if such is not done.

Conclusions

The following conclusions resulted from Experiment 2:

i) Infusion is not a strictly linear response to pressure or to timing with plateau levels appearing.

ii) Some tissue damage occurs at high pressure (e.g. 100 kPa) and long time periods (e.g. 30 minutes).

Experiment 3—Addition of Surfactants

It was demonstrated that the addition of low levels of surfactants increases the amount of agent infused. The procedures of Experiment 2 were employed, as described above, but with the addition of 0.001% Tween 20® or 0.0015 Silwet® to the infusion bath. The following tabulated resulting data was obtained:

TABLE 3

Results of Experiment 3
(Expressed in µg infused agent (glutamate) per gram fresh weight tissue at 30 kPa pressure for 10 minutes)

| Treatment | Material | | | | | |
|---|---|---|---|---|---|---|
| | Apple | Celery | Carrot | Tomato | Strawberry | Grape |
| Control (no surfactant) | 348 | 638 | 389 | 547 | 658 | 463 |
| Tween 20 ® | 413 | 769 | 491 | 703 | 688 | 495 |
| Silwet ® | 464 | 812 | 526 | 737 | 721 | 540 |

Conclusions

The following conclusions resulted from Experiment 3:

i) Addition of a surfactant at low levels in the infusion bath increases the amount of material infused.

Experiment 4—Concentration of Agents

It was demonstrated that a concentration of 2% of the agent in the infusion bath is efficient and effective. The procedures of Experiment 2 were employed, as described above, but with the concentration of agent (in this case, glutamate) in the infusion bath being varied. The following tabulated resulting data was obtained:

TABLE 4

Results of Experiment 4
(Expressed in µg infused agent (glutamate) per gram fresh weight tissue at 30 kPa pressure for 10 minutes)

| Treatment | Material | | | | | |
|---|---|---|---|---|---|---|
| | Apple | Celery | Carrot | Tomato | Strawberry | Grape |
| Agent @ 0.1% | 29 | 49 | 28 | 33 | 72 | 59 |
| Agent @ 1% | 171 | 235 | 99 | 171 | 338 | 192 |
| Agent @ 2% | 318 | 577 | 305 | 500 | 541 | 410 |
| Agent @ 4% | 567 | 723 | 613 | 738 | 829 | 722 |
| Agent @ 10% | 1,273 | 1,298 | 1,361 | 1,425 | 1,589 | 1,290 |

Conclusions

The following conclusions resulted from Experiment 4:

i) Amount of agent delivered is relatively linear with agent concentration in the infusion bath with a trend towards a plateau at higher levels for the range of concentrations tested.

ii) Although there is substantial inherent variability between materials, an agent concentration of 2% appears efficient for this work.

Experiment 5—Infusion of Various Agents

It was demonstrated that there is some variability in the performance between certain agents and certain materials so that each combination must be optimized for quantity and performance. The following procedures were employed and the following tabulated resulting data obtained:

i) Wash in 2% Clorox® bleach solution.

ii) Rinse 2× in water.

iii) Infuse in dH$_2$O bath containing 0.001% Tween 20® and 2% of the specified agent at 30 kPa for 10 minutes.

iv) Wash 2× with water and air dry, v) Analyze biological materials as in Experiment 2 above (with the exception of Ca++ and Zn++, which are determined by AA Spectroscopy and infused values expressed after subtraction of initial levels of these agents present in biological materials).

TABLE 5

Results of Experiment 5
(Express in μg infused agent per gram fresh weight)

| Treatment | Material | | | | | |
|---|---|---|---|---|---|---|
| | Apple | Celery | Carrot | Tomato | Strawberry | Grape |
| Ca++ | 301 | 462 | 271 | 419 | 488 | 344 |
| Zn++ | 279 | 519 | 322 | 384 | 462 | 415 |
| Methyl-scopolamine | 319 | 406 | 344 | 289 | 447 | 382 |
| Clozapine | 214 | 339 | 317 | 311 | 461 | 324 |
| Flunitrazepam | 261 | 388 | 280 | 327 | 493 | 357 |
| Pyrilamine | 310 | 411 | 322 | 355 | 449 | 381 |
| Methyltrienolone | 328 | 438 | 381 | 400 | 503 | 299 |

Conclusions

The following conclusions resulted from Experiment 5:

i) There is some variability in the performance between certain agents and certain materials so that each combination must be optimized for quantity and performance. The physiological state (e.g. progression of ripening or storage history prior to infusion) of the biological material must be of importance in the infusion process.

ii) These techniques appear broadly applicable to a wide universe of plant-based biological materials and diverse chemical agents with a range of biological activities.

Experiment 5—Bioactivity of Infused Agents—Taste Test

It was demonstrated that introduced flavoring agents can maintain their biological properties during their residence in the biological materials.

Apples, strawberries, carrots and celery were infused with either aspartame or saccharin with standard procedures, as described above, and sweetness was compared with untreated control. In each case (i.e., all four biological materials with each of the sweetening agents) the material was markedly and significantly sweeter to the taste almost to the point of being overwhelming. Clearly an optimal amount of sweetening agent would be lower. The taste test was repeated using a 0.2% concentration of each sweetening agent with the four biological materials. At this lower level of sweetener infusion the sweetness was reduced in each of the materials and was subjectively judged to be significantly enhanced over the untreated controls and more pleasurable to the taste.

Carrots, apples and squash were infused with 2% capsaicin (the active constituent of cayenne pepper) with standard procedures, as described above, and the taste or "heat" of the infused materials was compared with untreated control materials. In all three instances the treated material was markedly and significantly "hotter" to the taste than taste than control material.

Experiment 6—Bioactivity of Infused Agents—Pharmacology Activity Test

It was demonstrated that introduced drugs and drug-like agents can maintain their pharmacological activity during their residence in the biological materials. The following procedures were employed and the following data obtained:

TABLE 6

Muscarinic Binding Assay i) Muscarinic Binding Assay

Assay Characteristics:

| | |
|---|---|
| $K_D$ (binding affinity): | 0.17 nM |
| $B_{max}$ (receptor number): | 1,825 pmol/mg protein |
| Degree of Specific Binding: | 90% (Non-specific binding determined using 1.0 μM Methylscopolamine bromide) |

Materials and Methods:

| | |
|---|---|
| Receptor Source: | Human recombinant expressed in SF9 cell cultures |
| Radioligand: | [$^3$H] Methylscopolamine<br>Final ligand concentration - [0.2 nM] |
| Reference Compound: | (-) -Scopolamine, Methyl-, bromide (Methylscopolamine bromide) |
| Positive Control: | (-) -Scopolamine, Methyl-, bromide (Methylscopolamine bromide) |
| Incubation Conditions: | Reactions are carried out in 50 mM TRIS-HCl (pH 7.4) containing 10 mM MgCl$_2$, 1 mM EDTA for 60 minutes at 25° C. The reaction is terminated by rapid vacuum filtration onto glass fiber filters. Radioactivity trapped onto the filters is determined and compared to control values in order to ascertain any interactions of test compound(s) with the cloned muscarinic -M$_1$ binding site. |

TABLE 7

Clozapine Binding Assay ii) Clozapine Binding Assay

Assay Characteristics:

| | |
|---|---|
| $K_D$ (binding affinity): | 20.0 nM |
| $B_{max}$ (receptor number): | 105 fmol/mg tissue (wet weight) |

Materials and Methods:

| | |
|---|---|
| Receptor Source: | Rat striatal membranes |
| Radioligand: | [$^3$H] Clozapine<br>Final ligand concentration - [1.0 nM] |
| Non-Specific Determinant: | Clozapine - [1.0 μM] |
| Reference Compound: | Clozapine |
| Positive Control: | Clozapine |
| Incubation Conditions: | Reactions are carried out in 50 mM TRIS-HCl (pH 7.4) with 12.5 nM scopolamine and 0.125% BSA at 37° C. for 60 minutes. The reaction is terminated by rapid vacuum filtration onto glass fiber filters. Radioactivity trapped onto the filters is determined and compared to control values in order to ascertain any interactions of test compound with the clozapine binding site. |

TABLE 8

Gaba$_A$, Benzodiazepine (Central) Site Binding Assay iii) Gaba$_A$, Benzodiazepine (Central) Site Binding Assay Assay Characteristics:

| | |
|---|---|
| K$_D$ (binding affinity): | 1.4 nM |
| B$_{max}$ (receptor number): | 200 fmol/mg protein |

Materials and Methods:

| | |
|---|---|
| Receptor Source: | Bovine cortical membranes |
| Radioligand: | [$^3$H] Flunitrazepam |
| | Final ligand concentration - [0.5 nM] |
| Non-specific Determinant: | Ro15-1788 - [0.5 µM] |
| Reference Compound: | Ro15-1788 |
| Positive Control: | Ro15-1788 |
| Incubation Conditions: | Reactions are carried out in 10 mM Na—KPO$_4$ (pH 7.7) 0–4° C. for 45 minutes. The reaction is EDTA for 60 minutes at 25° C. The reaction is terminated by rapid vacuum filtration onto glass fiber filters. Radioactivity trapped onto the filters is determined and compared to control values in order to ascertain any interactions of test compound with the benzodiazepine (central) binding site. |

TABLE 9

Testosterone Binding Assay iv) Testosterone Binding Assay

Assay Characteristics:

| | |
|---|---|
| K$_D$ (binding affinity): | 4.0 nM |
| B$_{max}$ (receptor number): | 125 fmol/mg tissue (wet weight) |

Materials and Methods:

| | |
|---|---|
| Receptor Source: | Rat prostate cytosol |
| Radioligand: | [$^3$H] Methyltrienolone (R1881) |
| | Final ligand concentration - [0.5 nM] |
| Non-specific Determinant: | Methyltrienolone (R1881) - [10 µM] |
| Reference Compound: | Methyltrienolone (R1881) |
| Positive Control: | Methyltrienolone (R1881) |
| Incubation Conditions: | Reactions are carried out in 25 mM HEPES buffer (pH 7.4) containing 10 mM EDTA, 10 mM sodium molybdate, 10% glycerol, 0.2 mM leupeptin, and 0.5 mM PMSF at 0–4° C. for 18 hours. The reaction is terminated by the addition of dextran coated charcoal and incubated for 10 minutes at 0–4° C. The reaction mixtures are centrifuged and the radioactivity bound in the supernatant is compared to control values in order to ascertain any interactions of test compound with the testosterone binding site. |

Comments

Certain of the extracts from Experiment 5 which contained infused pharmaceutical agents were assessed for activity in in vitro receptor binding assays which often serve as reference standards of pharmaceutical activity. Methylscopolamine, an anticholinergic agent, demonstrated specific binding in a muscarinic assay (tested only in carrot and grape). Clozapine, an antipsychotic agent, demonstrated specific binding in the clozapine assay (tested only in apple and strawberry). Flunitrazepam, a hypnotic, demonstrated specific binding in the benzodiazepine central assay (tested only in celery and tomato). Pyrilamine, an antihistaminic, demonstrated specific binding in the histamine assay (tested only in grape and tomato). Finally, Methltrienolone, an anabolic steroid, demonstrated specific binding in the testosterone assay (tested only in apple and strawberry).

Conclusions

It was concluded that introduced drugs and drug-like agents can maintain their pharmacological activity during their residence in the plant biological material.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method of infusing an edible fresh or freshly-cut fruit or vegetable, said method comprising the steps of:
    allowing a fruit or vegetable to reach a state of relative metabolic stasis or inactivity;
    providing an infusion comprising an agent to be infused selected from the group consisting of a quality enhancing agent, a nutritionally beneficial agent, a pharmaceutical agent, and combinations of these, and a surfactant
    coating or submerging the fruit or vegetable in the infusion; and
    pressurizing the coated or submerged fruit or vegetable to a positive atmospheric pressure for a time period.

2. The method of claim 1 further comprising the step, after said allowing step, of disinfecting an outer surface of the fruit or vegetable.

3. The method of claim 2 wherein said disinfecting step comprises the step of disinfecting a surface of the fruit or vegetable with a bleach solution.

4. The method of claim 3 wherein said disinfecting step comprises the step of disinfecting a surface of the fruit or vegetable with a bleach solution having a concentration of about 2%.

5. The method of claim 2 wherein said disinfecting step comprises the step of disinfecting a surface of the fruit or vegetable with an antimicrobial soap solution.

6. The method of claim 5 wherein said disinfecting step comprises the step of disinfecting a surface of the fruit or vegetable with an antimicrobial soap solution having a concentration of about 2%.

7. The method of claim 1 wherein the quality enhancing agent is selected from the group consisting of an aroma enhancing agent, a flavoring enhancing agent, a sweetening agent, a color enhancing agent, an combinations of these.

8. The method of claim 1 wherein the nutritionally beneficial agent is selected from the group consisting of a vitamin, a mineral, an anti-oxidant, a phytochemical, and combinations of these.

9. The method of claim 1 wherein the pharmaceutical agent is selected from the group consisting of a prescription drug, an over-the-counter drug, and combinations of these.

10. The method of claim 1, wherein said surfactant comprises polysorbate 20.

11. The method of claim 10 wherein said providing an infusion step comprises the step of providing an infusion comprising an agent to be infused and a concentration of about 0.001% polysorbate 20.

12. The method of claim 1 wherein said providing an infusion step comprises the step of providing an infusion comprising an agent to be infused and an organosilicone surfactant.

13. The method of claim 12 wherein said providing an infusion step comprises the step of providing an infusion comprising an agent to be infused and a concentration of about 0.001% of an organosilicone surfactant.

14. The method of claim 1 wherein said pressurizing step comprises the step of pressurizing the infusion to a pressure in the range of about 1 kPa to about 1000 kPa for a time period.

15. The method of claim 14 wherein said pressurizing step comprises the step of pressurizing the infusion to a pressure in the range of about 10 kPa to about 100 kPa for a time period.

16. The method of claim 15 wherein said pressurizing step comprises the step of pressurizing the infusion to a pressure in the range of about 20 kPa to about 40 kPa for a time period.

17. The method of claim 16 wherein said pressurizing step comprises the step of pressurizing the infusion to a pressure of about 30 kPa for a time period.

18. The method of claim 1 wherein said pressurizing step comprises the step of pressurizing the infusion to a pressure for a time period in the range of about 0.1 minutes to about 60 minutes.

19. The method of claim 18 wherein said pressurizing step comprises the step of pressurizing the infusion to a pressure for a time period in the range of about 1 minute to about 30 minutes.

20. The method of claim 19 wherein said pressurizing step comprises the step of pressurizing the infusion to a pressure for a time period in the range of about 5 minutes to about 15 minutes.

21. The method of claim 20 wherein said pressurizing step comprises the step of pressurizing the infusion to a pressure for a time period of about 10 minutes.

22. The method of claim 2 further comprising, after said disinfecting step, the step of rinsing the fruit or vegetable in water.

23. The method of claim 1 further comprising, after said pressurizing step, the step of rinsing the fruit or vegetable in water.

24. A method of infusing an edible fresh or freshly-cut fruit or vegetable, said method comprising the steps of:
   allowing a fruit or vegetable to reach a state of relative metabolic stasis or inactivity;
   disinfecting an outer surface of the fruit or vegetable;
   providing an infusion comprising an agent to be infused selected from the group consisting of a quality enhancing agent, a nutritionally beneficial agent, a pharmaceutical agent, and combinations of these, and a surfactant;
   coating or submerging the fruit or vegetable in the infusion; and
   pressurizing the coated or submerged fruit or vegetable to positive atmospheric pressure in the range of about 20 kPa to about 40 kP for a time period in the range of about 5 minutes to about 15 minutes.

25. The method of claim 24 wherein said disinfecting step comprises the step of disinfecting a surface of the fruit or vegetable with a bleach solution.

26. The method of claim 25 wherein said disinfecting step comprises the step of disinfecting a surface of the fruit or vegetable with a bleach solution having a concentration of about 2%.

27. The method of claim 24 wherein said disinfecting step comprises the step of disinfecting a surface of the fruit or vegetable with an antimicrobial soap solution.

28. The method of claim 27 wherein said disinfecting step comprises the step of disinfecting a surface of the fruit or vegetable with an antimicrobial soap solution having a concentration of about 2%.

29. The method of claim 24 wherein the quality enhancing agent is selected from the group consisting of an aroma enhancing agent, a flavoring enhancing agent, a sweetening agent, a color enhancing agent, and combinations of these.

30. The method of claim 24 wherein the nutritionally beneficial agent is selected from the group consisting of a vitamin, a mineral, an anti-oxidant, a phytochemical, and combinations of these.

31. The method of claim 24 wherein the pharmaceutical agent is selected from the group consisting of a prescription drug, an over-the-counter drug, and combinations of these.

32. The method of claim 24 wherein said providing an infusion step comprises the step of providing an infusion comprising an agent to be infused and polysorbate 20.

33. The method of claim 32 wherein said providing an infusion step comprises the step of providing an infusion comprising an agent to be infused and a concentration of about 0.001% polysorbate 20.

34. The method of claim 24 wherein said providing an infusion step comprises the step of providing an infusion comprising an agent to be infused and an organosilicone surfactant.

35. The method of claim 34 wherein said providing an infusion step comprises the step of providing an infusion comprising an agent to be infused and a concentration of about 0.001% of an organosilicone surfactant.

36. The method of claim 24 wherein said pressurizing step comprises the step of pressurizing the infusion to a pressure of about 30 kPa for a time period in the range of about 5 minutes to about 15 minutes.

37. The method of claim 24 wherein said pressurizing step comprises the step of pressurizing the infusion to a pressure in the range of about 20 kPa to about 40 kPa for a time period of about 10 minutes.

38. The method of claim 24 further comprising, after said disinfecting step, the step of rinsing the fruit or vegetable in water.

39. The method of claim 24 further comprising, after said pressurizing step, the step of rinsing the fruit or vegetable in water.

40. A method of infusing an edible fresh or freshly-cut fruit or vegetable, said method comprising the steps of:
   allowing a fruit or vegetable to reach a state of relative metabolic stasis or inactivity;
   disinfecting a outer surface of the fruit or vegetable;
   rinsing the fruit or vegetable in water;
   providing an infusion comprising an agent to be infused selected from the group consisting of a quality enhancing agent, a nutritionally beneficial agent, a pharmaceutical agent, and combinations of these, and a concentration of about 0.001% of a surfactant;
   submerging the fruit or vegetable in the infusion;
   pressurizing the infusion to a positive atmospheric pressure of about 30 kPa for a time period of about 10 minutes; and
   rinsing the fruit or vegetable in water.

41. The method of claim 40 wherein said disinfecting step comprises the step of disinfecting a surface of the fruit or vegetable with a bleach solution.

42. The method of claim 41 wherein said disinfecting step comprises the step of disinfecting a surface of the fruit or vegetable with a bleach solution having a concentration of about 2%.

43. The method of claim 40 wherein said disinfecting step comprises the step of disinfecting a surface of the fruit or vegetable with an antimicrobial soap solution.

44. The method of claim 43 wherein said disinfecting step comprises the step of disinfecting a surface of the fruit or vegetable with an antimicrobial soap solution having a concentration of about 2%.

45. The method of claim 40 wherein the quality enhancing agent is selected from the group consisting of an aroma enhancing agent, a flavoring enhancing agent, a sweetening agent, a color enhancing agent, and combinations of these.

46. The method of claim 40 wherein the nutritionally beneficial agent is selected from the group consisting of a vitamin, a mineral, an anti-oxidant, a phytochemical, and combinations of these.

47. The method of claim 40 wherein the pharmaceutical agent is selected from the group consisting of a prescription drug, an over-the-counter drug, and combinations of these.

48. The method of claim 40 wherein said providing an infusion step comprises the step of providing an infusion comprising an agent to be infused and a concentration of about 0.001% polysorbate 20.

49. The method of claim 40 wherein said providing an infusion step comprises the step of providing an infusion comprising an agent to be infused and a concentration of about 0.001% of an organosilicone surfactant.

* * * * *